(12) United States Patent
Niazi

(10) Patent No.: US 8,407,724 B2
(45) Date of Patent: Mar. 26, 2013

(54) AGILE HELP, DEFECT TRACKING, AND SUPPORT FRAMEWORK FOR COMPOSITE APPLICATIONS

(75) Inventor: Uzair Ahmed Niazi, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 574 days.

(21) Appl. No.: 12/640,621

(22) Filed: Dec. 17, 2009

(65) Prior Publication Data

US 2011/0154372 A1 Jun. 23, 2011

(51) Int. Cl.
*G06F 13/00* (2006.01)
(52) U.S. Cl. ............... 719/316; 707/999.1; 707/999.104
(58) Field of Classification Search .................. 719/316; 707/999.1, 999.104
See application file for complete search history.

(56) References Cited

U.S. PATENT DOCUMENTS

| | | | |
|---|---|---|---|
| 6,236,989 B1 * | 5/2001 | Mandyam et al. ..................... 1/1 |
| 2007/0219976 A1 * | 9/2007 | Muralidhar et al. ............... 707/4 |
| 2008/0066050 A1 * | 3/2008 | Jain et al. ....................... 717/101 |

OTHER PUBLICATIONS

Bugzilla::WebService, http://www.bugzilla.org/docs/3.0/html/api/Bugzilla/WebService.html, Jul. 7, 2007.*

* cited by examiner

*Primary Examiner* — Andy Ho
(74) *Attorney, Agent, or Firm* — Kilpatrick Townsend & Stockton LLP

(57) ABSTRACT

This disclosure describes, generally, methods and systems for implementing agile and dynamic help, defect tracking, and support frameworks for composite applications. The method includes implementing, on a computer system including a storage database, a composite application including a plurality of application components and establishing, in the computer system's storage database, a storage container for each of the plurality of application components. The storage containers are configured to store support information for each of the component applications. The method further includes storing, in the storage database, support data for each of the plurality of component applications, removing at least one of the plurality of component applications from the composite application, and maintaining, in the storage database, the support data for the remaining component applications of the composite application.

9 Claims, 5 Drawing Sheets

AGILE HELP, DEFECT TRACKING, AND SUPPORT FRAMEWORK FOR COMPOSITE APPLICATIONS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to help, defect tracking, and support and, more particularly, to implementing agile and dynamic help, defect tracking, and support frameworks for composite applications.

BACKGROUND

Currently, in order to remain successful, organizations need to react quickly to changes in their business environment in order to take advantage of opportunities in the marketplace and to stave off competitive threats. The change could be due to any number of internal or external factors; however, whatever their cause, organizations need to be able to rapidly change their business processes effectively and efficiently in response to such a change. Changing business processes also requires changes to business policies, the training of business users and end users, and of the business applications that support those business processes and policies.

Presently, business applications (e.g., ERP, SCM, CRM, etc.) are not flexible to include configuration options to support changes in business processes. Consequently, often times organizations end up with sub-optimal solutions to address their problems (e.g., a system work-around may be employed, or applications code may be "customized" to support the organizations business needs, or worse still the business process may be adapted to fit what can be supported by the application). These approaches are not easily supportable and incur additional costs on the organization.

Furthermore, business processes within an organization can span many disparate applications from different vendors/ suppliers and on different platforms and legacy systems. That is, a business process may require an output, data or result of a business function from one system or module to feed into the input of a business function of another system or module. This makes it all the more difficult to meet the organizations need for agile business applications since the systems from the disparate vendors need to be interoperable.

Some of these problems are starting to be alleviated with the use of Services and Service Orientated Architecture (SOA). Using SOA applications functionality from disparate vendors can be "exposed" as services and "orchestrated" (using orchestration capabilities like Business Process Execution Language (BPEL)) into new composite applications. These composite applications can be developed to support an organization's business processes. The services are "exposed" using industry standard protocols so that they are interoperable and using the appropriate tools can be more readily orchestrated.

Although using Services and SOA permits organizations to assemble their own composite applications to better support their own business processes, the following problem areas remain: 1) How to provide an effective (and agile) help system for users of the composite application, 2) How to provide effective (and agile) defect tracking for the composite application, and 3) How to create an effective (and agile) knowledge base for supporting the composite application. In effect, when an organization creates a composite application (potentially from different vendors and on different platforms), the organization is creating a new, and potentially unique, composite application that is not supported by any one vendor and must be supported by the organization itself.

It is given that each application service that is "exposed" by a vendor, would be supported in the same way that one would expect a vendor to support their published APIs (application programming interface). However, an organization that creates a composite application is responsible for the support of the resulting composite application itself, and the greater the number of services that an organization uses from different vendors and or legacy systems, the more complicated the support issues become.

Hence, the IT department of an organization or a system integrator on behalf of the organization, would be required to "hard code" user help system for the components that comprise the composite application. The disadvantage of hard coding the user help is that it will need to be re-coded for every change of the components that comprise the composite application. A further problem occurs when the composite application is deployed and issues are encountered by end users that result in the user requiring support from the organization's IT helpdesk. By creating a composite application the organization must now support any user issues that arise. Therefore, there is a need to capture defect information and sufficient details of the composite application and the composite application's components in order to provide an effective knowledge base of issues and their solutions such that the IT Helpdesk can triage and support any issues that arise.

Further, as new components are added or modifications are made to existing components of the composite application, it becomes difficult to keep track of the configuration of each of the components that comprise the composite application consequently any knowledge base can quickly become outdated and the burden of support by the organization increases with time. Hence, for these and other reasons, improvements in the art are needed.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

SUMMARY OF THE INVENTION

Figure 1:
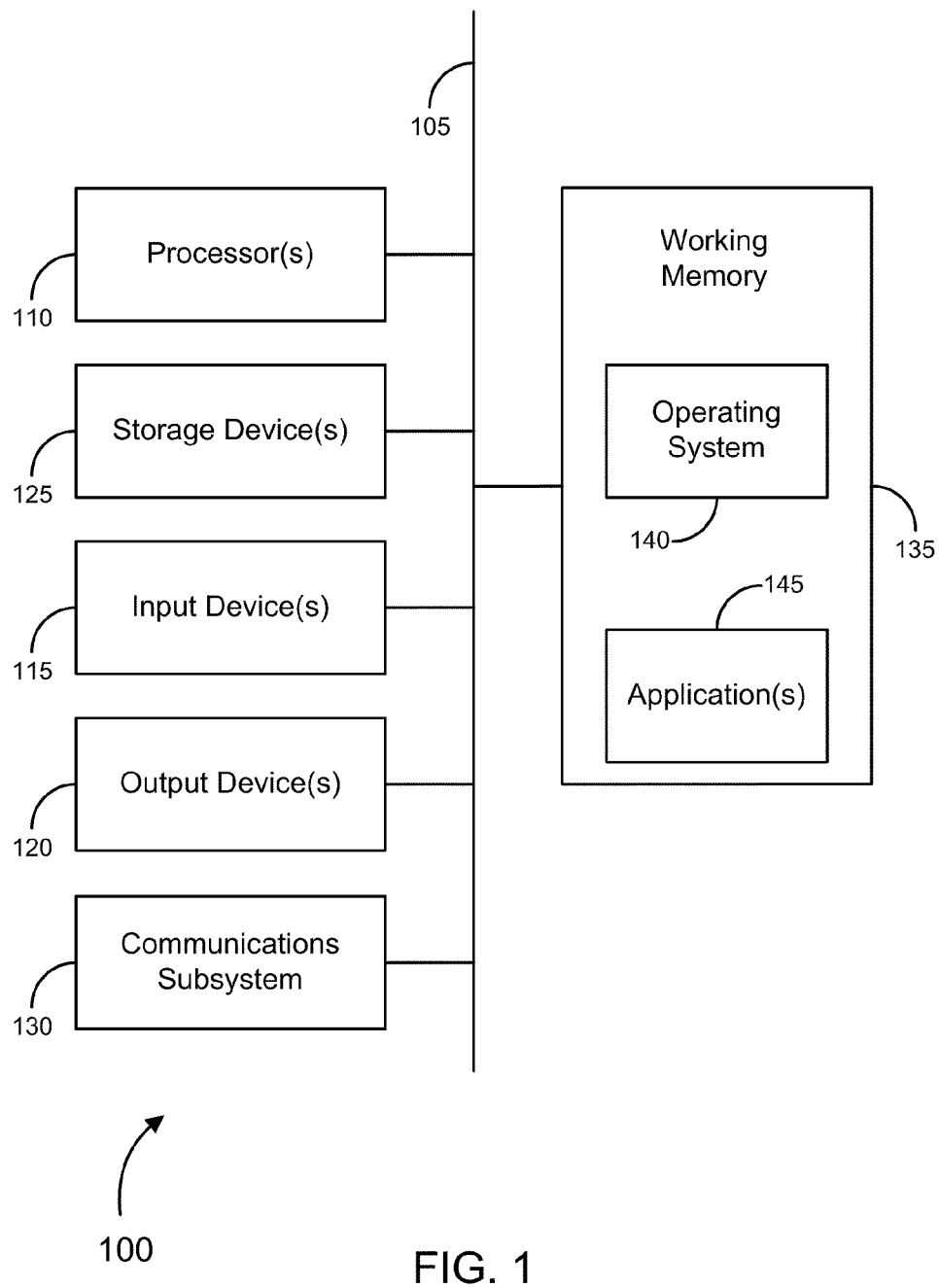
FIG. 1 is a generalized schematic diagram illustrating a computer system, in accordance with various embodiments of the present invention.

Aspects of the present invention relate to providing capabilities that hitherto are not available to composite applications. With a major emphasis on Service Oriented Architecture (SOA) and the increased development of composite applications, the present invention provides a major advantage for creating, maintaining, and supporting any composite application even when the composite application changes over time. Further aspects of the present invention automatically create "containers" that can be used for creating user help to support composite applications. The containers are also created to support defect tracking and a user knowledge base information. The structure of each component of the composite application may be automatically extracted from the definition of the business process flow/composite application. These details may also include the services that each component uses as part of the composite application, as such defects that are reported can be logged easily by entering the details against the categories identified in the knowledge base repository.

Furthermore, the knowledge base support repository is "aware" of the components of each composite application, their configuration at any particular time of use (e.g., version number, etc.), and any support issues that are raised. This information is attributed to either a component in the composite application, or in one of the connections/interfaces between components or indeed in the overarching orchestration process that binds the composite application together.

In one embodiment of the present invention, there are three functional parts that are described below that each work together to provide the maximum benefit to an organization that creates and manages composite applications.

Help system: When a composite application is developed, the fact that it is a new application that comprises of an orchestration of services that meets the needs of supporting a business process for the organization—there is no vendor provided help system for that composite application. The help system must be created by the organization itself at design/build time when creating the composite application. The framework described below will automatically generate containers that can be used to create the help system for the composite application. In addition, each component that is part of the composite application can have its' online help content accessible through the use of appropriate links in the help system container.

User extensible knowledge base: Now as the knowledge base is built up over a period of time, when the composite application changes, in order to support changes in the business processes the knowledge repository associated with the components of the composite application "follow" the component to any new composite application configuration. For example, composite application A includes components X, Y, and Z, and composite application B includes components C, D, and Z, then the container for component Z would include defect, help and knowledge base information for component Z with respect to occurrences in composite A as well as composite B. Furthermore, if, for example, component X was removed from composite A, the defects, help, and knowledge base information for components Y and Z (as well as any configuration or interaction data) would persist in the containers for Y and Z, respectively. Thus, the containers maintain defect, help, and knowledge base information for each individual component independent from other components or the composite applications they are members of.

Further, the help system containers can be automatically linked to a user extensible repository (e.g., using a capability such as a wiki or the like) where end users or business users themselves can add to the help system provided by the organization. That is, typically after the organizations IT group has deployed the composite application the end users themselves can add details on business policies and/or details as to how to use the new composite application effectively and efficiently.

Defect tracking: Now once a composite application has been developed to support an organizations business processes and operations, the organization supports the composite application for its end users. Typically, an organization will have a helpdesk department that end users will log (via phone, email, webpage, etc.) for support/defect issues. The helpdesk personnel can then investigate the issue and respond with a solution to that problem. In the case of the composite application, the organizations helpdesk now has to respond to a new class of application to support, that of the composite application that has been developed by the organization itself.

In one embodiment of the present invention, the framework described below tracks each component of the composite application, each interface, and each connection between the interfaces of the components of the composite application. In this way, the organization will be able to track a defect down to the components of the composite application. This gives the organization greater insight into the reliability of the components that comprise the composite applications. For example, after a composite application has been deployed, the organization can query the defect tracking system to gather detailed information regarding which components of the composite have generated the greatest level of support calls, which have resulted from bugs in the software from the vendors of the component parts of the composite application, which have resulted from bugs in the composite application interfaces or orchestration code itself, etc.

Furthermore, using the framework, details of the components of the composite application, the interfaces, connections between components, orchestration and overall configuration are captured and defect information is recorded against these component items by, for example, the helpdesk. Consequently, when changes are made to the configuration of the composite application, those parts of the defect tracking knowledge base can "move" with any changes to the composite application.

For example, if a composite application had a component that was no longer required to support an organizations business process, it can be removed; however, using the framework the record of any defects that are associated with that component is still maintained. Thus, when and if that component is added to a different composite application (or is already included in other composite applications), the knowledge base for that component will automatically be linked into the overall knowledge base for the new composite application. The ability to retain the link between the component and the defect knowledge base reduces the cost of ownership of that component within any composite application within the organization.

There is no loss of defect knowledge (or data on component reliability) within the organization, even after the composite applications are modified. The defect knowledge base of the composite application components are maintained so that any new configuration will automatically have that information/data available to any helpdesk personnel that need to support that component as part of a new composite application.

Further, the framework permits the selection of the component against which the defect is finally attributed via a graphical representation of the business flow chart of the application. So, helpdesk personnel can associate the defect to the component of the composite application by clicking on the visual representation of the component in the composite application.

Now just in the same way that the defect knowledge base can "follow" the components within the composite application, so can the help system information also track and "move" with these components. That is, when the composite application is changed, the help system information containers for that component will also move with that component. When the component is removed from a composite application, so will the defect knowledge base and the help system information. When that component is put into a new composite application, the help and defect knowledge base will form part of the help and defect knowledge base of the new composite application. This allows the help and defect information to be as agile as the underlying changes to the business processes that are supported by the composite application and ultimately keep the overall cost down of maintaining composite applications within an organization.

Unlike other software applications, a defect tracking system is not an integral part of the application itself. Typically, the defect tracking system is a separately developed and deployed application provided by specialist vendors of defect tracking software that is used to log and track defects and issues. With the framework in the present invention, the defect tracking components are generated at design time at the same time as the composite application is created. Consequently, when the composite application is changed so to will the configuration of the defect tracking components, even though the defect tracking system is re-configured any defect knowledge that has been created/recorded against that component is retained in the final configuration of the deployed composite application.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor (s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
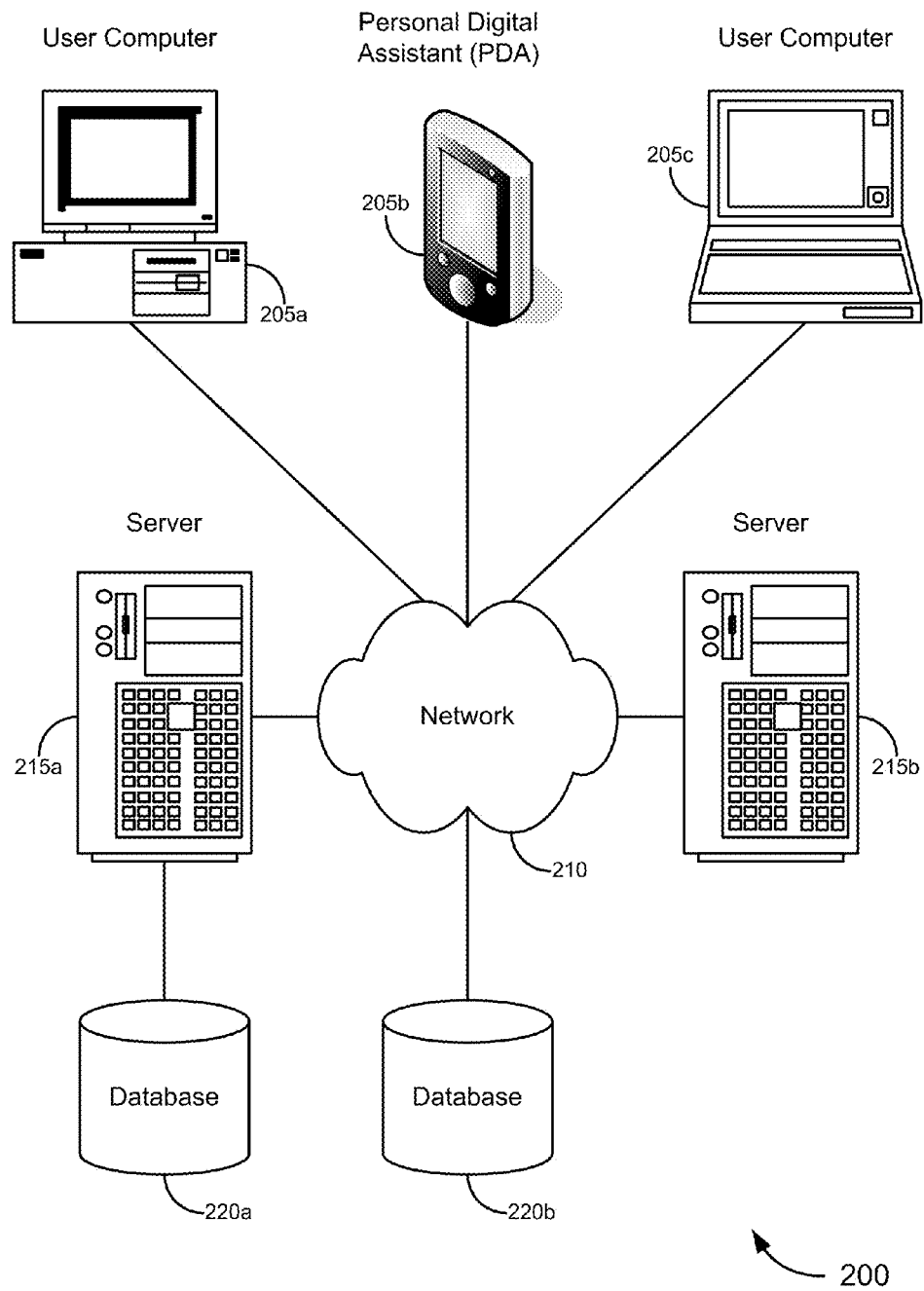
FIG. 2 is a block diagram illustrating a networked system of computers, which can be used in accordance with various embodiments of the present invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
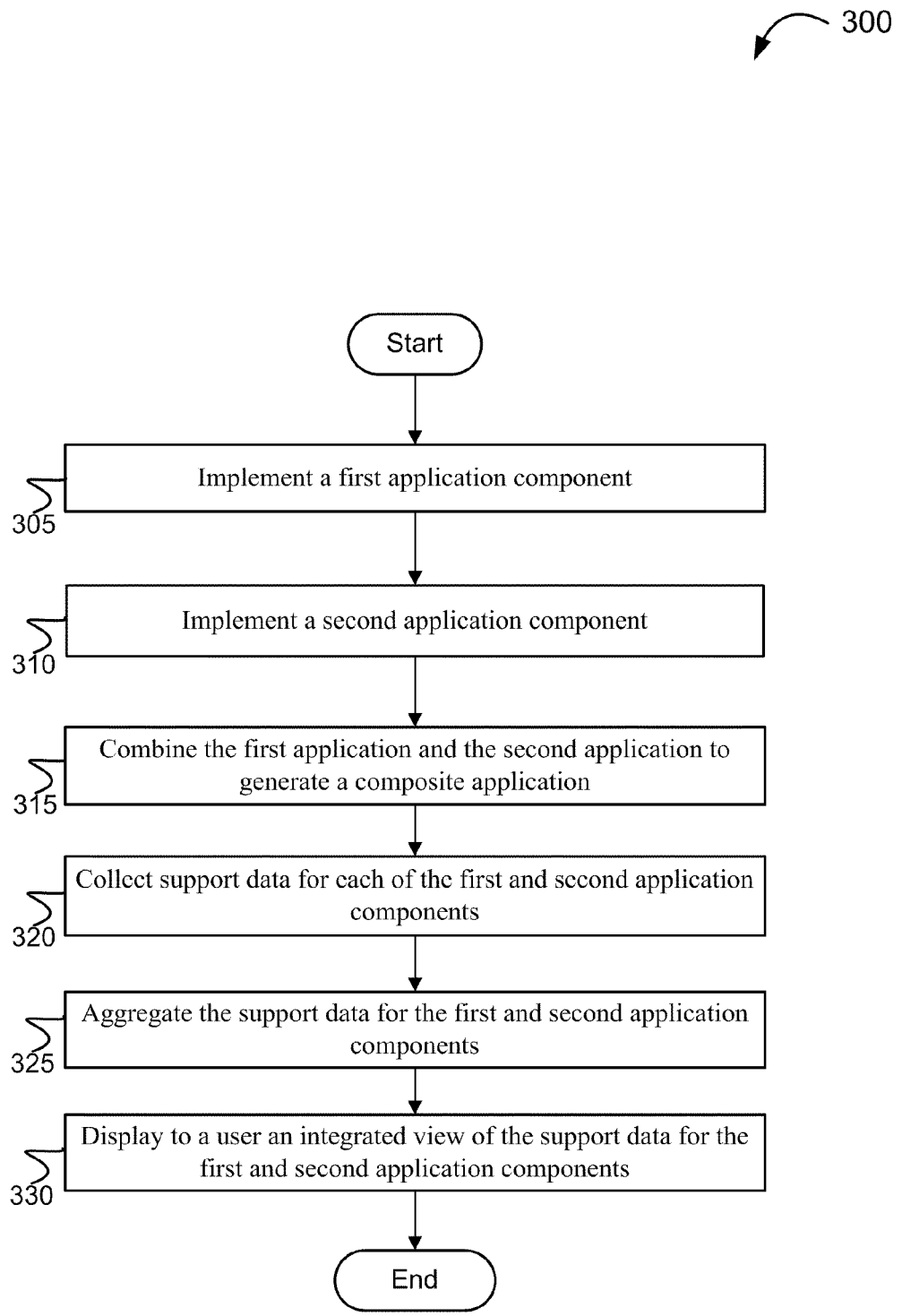
FIG. 3 is a flow diagram illustrating a method of implementing agile and dynamic help, defect tracking, and support frameworks for composite applications, in accordance with one embodiment of the present invention.

Turning now to FIG. 3, which illustrates a method 300 of implementing agile and dynamic help, defect tracking, and support frameworks for composite applications, in accordance with one embodiment of the present invention. At process block 305, a first application component is implemented and at process block 310, a second application component is implemented. Additional application components may be implemented, such that any number of application components may exist. In one embodiment, an application component may be a legacy application, an application module, a financial application, a human resources application, or any other application which may be combined into a composite application.

At process block 315, the first and second application components are combined into a composite application. The combination may be performed using SOA, or the like. The composite application is configured to be executed as a seamless single application. At process block 320, support data for each of the first and second application components, the interfaces between the application components, and inputs and outputs to the composite application. The support data may further include help documentation, info base information, errors, defects, etc. Furthermore, version information may also be maintained.

At process block 325, the support data may be aggregated for the first and second application components into a consolidated view. For example, any errors, help documents, etc. can be viewed in a seamless user interface. Furthermore, as changes are made to support data for each application component, an updated view is maintained regardless of the composite applications implementing the application component. For example, composite application A may be implementing application components C and D, while composite application B implements application components D and E. In this situation, if support data application component D was to change, the changed support data would be available for viewing for both composite applications A and B (i.e., support data for composite applications A and B would be in sync). Then, at process block 330, the support data may be viewed by a user in a user interface.

Additionally, the support data may be filtered based on the user that is accessing the data. For example, the user may be an administrator, an IT professional, a tester, an end-user, a customer, etc., and as such each type of user would likely need to view some subset of the support data. For example, the end-user or customer may not desire to view errors or bug reports, whereas an administrator, IT professional, or tester may desire to view errors and bug reports. Accordingly, the support data which is rendered may be dynamic based on the type of user viewing the support data.

Figure 4:
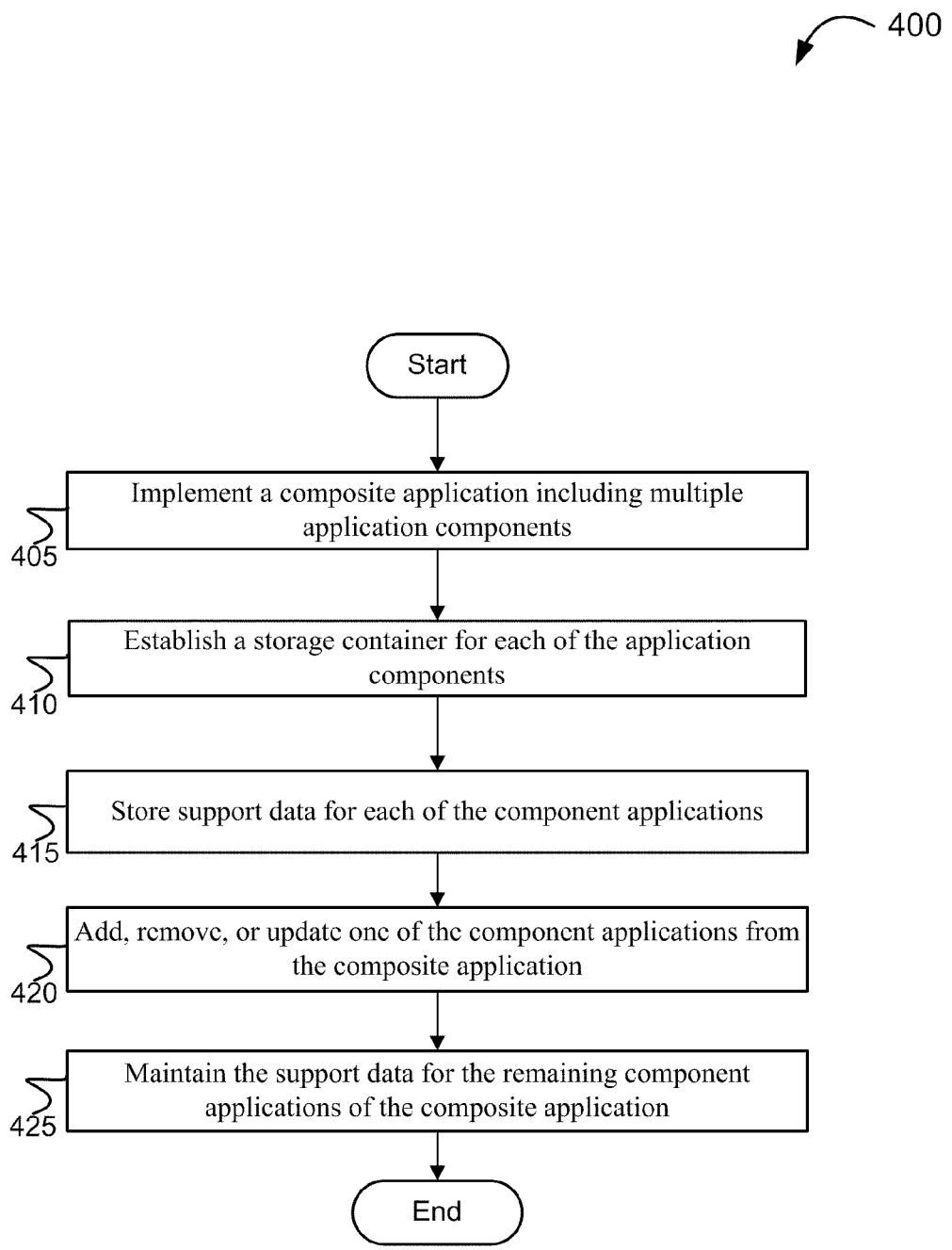
FIG. 4 is a flow diagram further illustrating a method of implementing agile and dynamic help, defect tracking, and support frameworks for composite applications, in accordance with one embodiment of the present invention.

Referring next to FIG. 4, which illustrates a method 400 of implementing agile and dynamic help, defect tracking, and support frameworks for composite applications, in accordance with a further embodiment of the present invention. At process block 405, a composite application is implemented which includes multiple application components. At process block 410, a storage container for each of the application components may be established. The storage containers may be stored in a database, or the like. Thus, each application component has a corresponding container used to store support data specific to the corresponding application component and independent form any other application component (process block 415). Hence, each application component has a stand alone container.

At process block 420, an application component may be added, removed, or updated from the composite application. Hence, at process block 425, the support data for the new configuration of components is maintained, as well as any component that is removed form the composite application.

For example, if a component was added to the composite application, and the component was already being used by another composite application, the support data previously stored in the component's container would now be available to the new composite. Hence, persistent component independent support data storage is maintained for each component.

Figure 5:
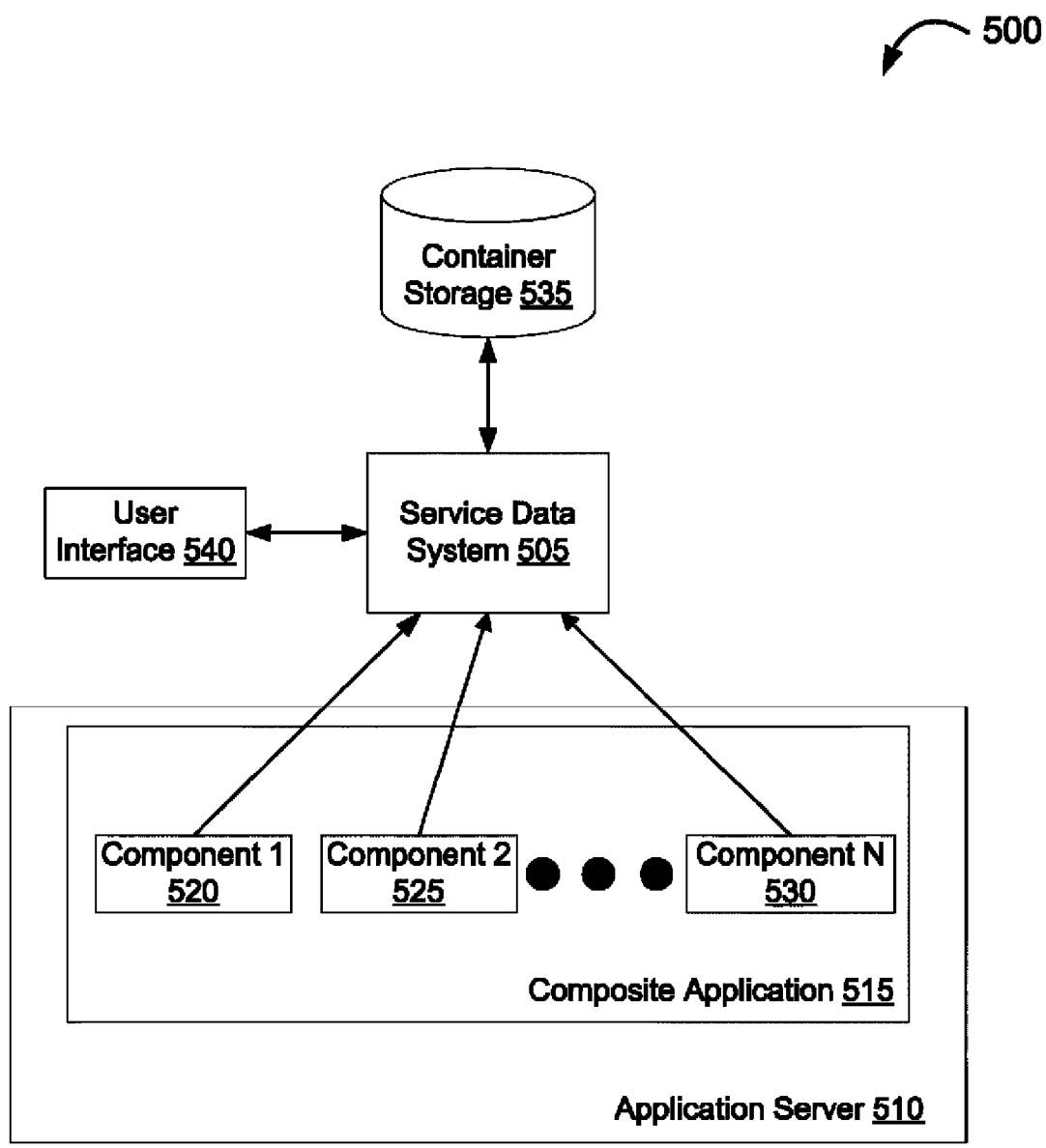
FIG. 5 is a block diagram illustrating a system for implementing agile and dynamic help, defect tracking, and support frameworks for composite applications, in accordance with another embodiment of the present invention.

FIG. 5 illustrates a system 500 for implementing agile and dynamic help, defect tracking, and support frameworks for composite applications, in accordance with another embodiment of the present invention. System 500 includes an application server 510 implementing a composite application 515. Further, composite application 515 includes components 1, 2, to N 520, 525, and 530. In addition, components 520, 525, and 530 may be configured to interact with service data system 505. Furthermore, service data system 505 may be in communication with container storage 535 and user interface 540. In one embodiment, system 500 may be used to implement come or all of methods 3 and 4 (FIGS. 3 and 4).

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing agile and dynamic help, defect tracking, and support frameworks for composite applications, the method comprising:
    implementing, on a computer system including a storage database, a composite application including a plurality of application components;
    establishing, in the computer system's storage database, a storage container for each of the plurality of application components, wherein the storage containers are configured to store support information for each of the component applications;
    automatically extracting a structure of each component of each of the plurality of composite applications from a definition of a business process flow, wherein the definition includes services that each component use as part of the composite application including defects that are reported and logged and entering details against categories identified in the knowledge base repository, wherein the knowledge base support repository is aware of the components of each of the plurality of composite applications, configuration at any particular time of use of each of the plurality of composite applications, and any support issues that are raised for each of the plurality of composite applications;
    storing, in the storage database, support data for each of the plurality of component applications;
    removing at least one of the plurality of component applications from the composite application; and
    maintaining, in the storage database, the support data for the remaining component applications of the composite application.

2. The method of implementing agile and dynamic help, defect tracking, and support frameworks for composite applications, as in claim 1, wherein the support data comprises one or more of the following: help documentation data, defect reports, and info base data.

3. The method of implementing agile and dynamic help, defect tracking, and support frameworks for composite applications, as in claim 2, wherein the storage containers maintain version information for each of the plurality of application components.

4. The method of implementing agile and dynamic help, defect tracking, and support frameworks for composite applications, as in claim 1, wherein the implementing of the composite application comprises using a Service Orientated Architecture (SOA).

5. The method of implementing agile and dynamic help, defect tracking, and support frameworks for composite applications, as in claim 1, wherein the user comprises one or more of the following user types: an administrator, IT personnel, and a customer.

6. The method of implementing agile and dynamic help, defect tracking, and support frameworks for composite applications, as in claim 5, further comprising filtering the support data based on the user type of the user accessing the user interface.

7. A system for implementing agile and dynamic help, defect tracking, and support frameworks for composite applications, the system comprising:
    a storage device; and
    a computer processor in communication with the storage device, wherein the storage devices has sets of instruction stored therein which, when executed by the computer processor, cause the computer processor to:
        implement a storage database, a composite application including a plurality of application components;
        establish a storage container for each of the plurality of application components, wherein the storage containers are configured to store support information for each of the component applications;
        automatically extract a structure of each component of each of the plurality of composite applications from a definition of a business process flow, wherein the definition includes services that each component use as part of the composite application including defects that are reported and logged and entering details against categories identified in the knowledge base repository, wherein the knowledge base support repository is aware of the components of each of the plurality of composite applications, configuration at any particular time of use of each of the plurality of composite applications, and any support issues that are raised for each of the plurality of composite applications;

store support data for each of the plurality of component applications;

remove at least one of the plurality of component applications from the composite application; and maintain the support data for the remaining component applications of the composite application.

8. A non-transitory machine-readable medium for implementing agile and dynamic help, defect tracking, and support frameworks for composite applications, having sets of instructions which, when executed by a machine, cause the machine to:

implement a storage database, a composite application including a plurality of application components;

establish a storage container for each of the plurality of application components, wherein the storage containers are configured to store support information for each of the component applications;

automatically extract a structure of each component of each of the plurality of composite applications from a definition of a business process flow, wherein the definition includes services that each component use as part of the composite application including defects that are reported and logged and entering details against categories identified in the knowledge base repository, wherein the knowledge base support repository is aware of the components of each of the plurality of composite applications, configuration at any particular time of use of each of the plurality of composite applications, and any support issues that are raised for each of the plurality of composite applications;

store support data for each of the plurality of component applications;

remove at least one of the plurality of component applications from the composite application; and maintain the support data for the remaining component applications of the composite application.

9. A non-transitory machine-readable medium for implementing agile and dynamic help, defect tracking, and support frameworks for composite applications, as in claim 8, wherein the support data comprises one or more of the following:

help documentation data, defect reports, and info base data.

\* \* \* \* \*

UNITED STATES PATENT AND TRADEMARK OFFICE
CERTIFICATE OF CORRECTION

PATENT NO.      : 8,407,724 B2
APPLICATION NO. : 12/640621
DATED           : March 26, 2013
INVENTOR(S)     : Niazi It is certified that error appears in the above-identified patent and that said Letters Patent is hereby corrected as shown below:

In the Specification:

In column 5, line 37, delete "so to" and insert -- so too --, therefor.

In column 10, line 67, delete "form" and insert -- from --, therefor.

Signed and Sealed this
Ninth Day of July, 2013

Teresa Stanek Rea
*Acting Director of the United States Patent and Trademark Office*